United States Patent
Kao et al.

(10) Patent No.: US 12,493,572 B2
(45) Date of Patent: Dec. 9, 2025

(54) UNIVERSAL SERIAL BUS ARCHITECTURE

(71) Applicant: WELTREND SEMICONDUCTOR INC., Hsinchu (TW)

(72) Inventors: Ming-Hung Kao, Hsinchu (TW); Meng-Che Tsai, Hsinchu (TW); Chao-Chee Ku, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 36 days.

(21) Appl. No.: 18/601,982

(22) Filed: Mar. 11, 2024

(65) Prior Publication Data

US 2025/0199975 A1 Jun. 19, 2025

(30) Foreign Application Priority Data

Dec. 14, 2023 (TW) ................. 112148672

(51) Int. Cl.
*G06F 13/38* (2006.01)
*G06F 1/26* (2006.01)
*G06F 13/42* (2006.01)

(52) U.S. Cl.
CPC ............ *G06F 13/382* (2013.01); *G06F 1/266* (2013.01); *G06F 13/4282* (2013.01); *G06F 2213/0042* (2013.01)

(58) Field of Classification Search
CPC .................................................... G01B 11/026
See application file for complete search history.

(56) References Cited

U.S. PATENT DOCUMENTS

2017/0040819 A1* 2/2017 Ono ................. H02M 3/33507
2021/0273473 A1* 9/2021 Jahan ................. H02J 7/00041

FOREIGN PATENT DOCUMENTS

| CN | 112673363 A | 4/2021 |
| TW | 202026898 A | 7/2020 |
| TW | 202221522 A | 6/2022 |
| TW | 202343270 A | 11/2023 |

* cited by examiner

*Primary Examiner* — Henry Tsai
*Assistant Examiner* — Juanito C Borromeo
(74) *Attorney, Agent, or Firm* — Winston Hsu

(57) ABSTRACT

A universal serial bus (USB) Type-C interface architecture includes a USB plug, a USB socket, a power delivery controller, a first pin, a second pin, a first resistor switch, a second resistance switch, a third resistance switch and a fourth resistance switch. The first pin includes a first end coupled to the USB plug, and a second end coupled to the power delivery controller. The second pin includes a first end coupled to the USB plug, and a second end coupled to the power delivery controller. The first resistance switch controls the connection between a first resistor and the first pin. The second resistor switch controls the connection between a second resistor and the first pin. The third resistor switch controls the connection between a third resistor and the second pin. The fourth resistor switch controls the connection between a fourth resistor and the second pin.

8 Claims, 5 Drawing Sheets

|  | First pin P1 | Second pin P2 | Whether to switch the resistor switches |
|---|---|---|---|
| Default state (plugged forward) | 5.1kΩ | 1kΩ | |
| Requirements of the device (plugged forward) | 5.1kΩ | 1kΩ | No |
| Requirements of the device (plugged reversely) | 1kΩ | 5.1kΩ | Yes |

FIG. 3

UNIVERSAL SERIAL BUS ARCHITECTURE

BACKGROUND OF THE INVENTION

1. Field of the Invention

The invention relates to a Universal Serial Bus (USB) architecture, and in particular to an architecture for improving USB Type-C interfaces compatibility.

2. Description of the Prior Art

Universal Serial Bus (USB) Type-C interface is a USB hardware interface form. With the development and popularity of USB Type-C, many electronic devices can be charged or send data through USB Type-C. However, when connecting USB Type-C to Type-C, since there may be different devices in different usage scenarios, compatibility issues may be caused. For example, the host connected to the USB plug may be disposed to 4 channels of Display Port (DP) display bandwidth, but the device connected to the USB socket may require 2 channels of DP display bandwidth and 2 channels of USB bandwidth, thus incompatibility occurs. Furthermore, in the previous technology, a high-speed multiplexer (MUX) is used to switch signals to allow USB Type-C to plug forward and reversely. However, the high cost of high-speed MUX leads to an increase in the overall cost.

SUMMARY OF THE INVENTION

According to an embodiment of the invention, a universal serial bus (USB) architecture comprises a USB plug, a USB socket, a power delivery controller, a power cord, a signal transmission channel, a first pin, a first resistor switch, a second resistor switch, a second pin, a third resistor switch, and a fourth resistor switch. The power delivery controller is coupled to the USB plug and the USB socket. The power wire is coupled to the USB plug and the USB socket, and is configured to supply power from the USB plug to the USB socket. The signal transmission channel is coupled to the USB plug and the USB socket, and is configured to send an image signal from the USB plug to the USB socket. The first pin comprises a first end coupled to the USB plug and a second end coupled to the power delivery controller. The first resistor switch is coupled to the first pin, and is configured to control a connection between a first resistor and the first pin. The second resistor switch is coupled to the first pin, and is configured to control a connection between a second resistor and the first pin. The second pin comprises a first end coupled to the USB plug and a second end coupled to the power delivery controller. The third resistor switch is coupled to the second pin, and is configured to control a connection between a third resistor and the second pin. The fourth resistor switch is coupled to the second pin, and is configured to control a connection between a fourth resistor and the second pin.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows a chart of how the USB architecture in FIG. 1 switches the resistor switches according to whether the device is plugged forward or reversely.

DETAILED DESCRIPTION

Figure 1:
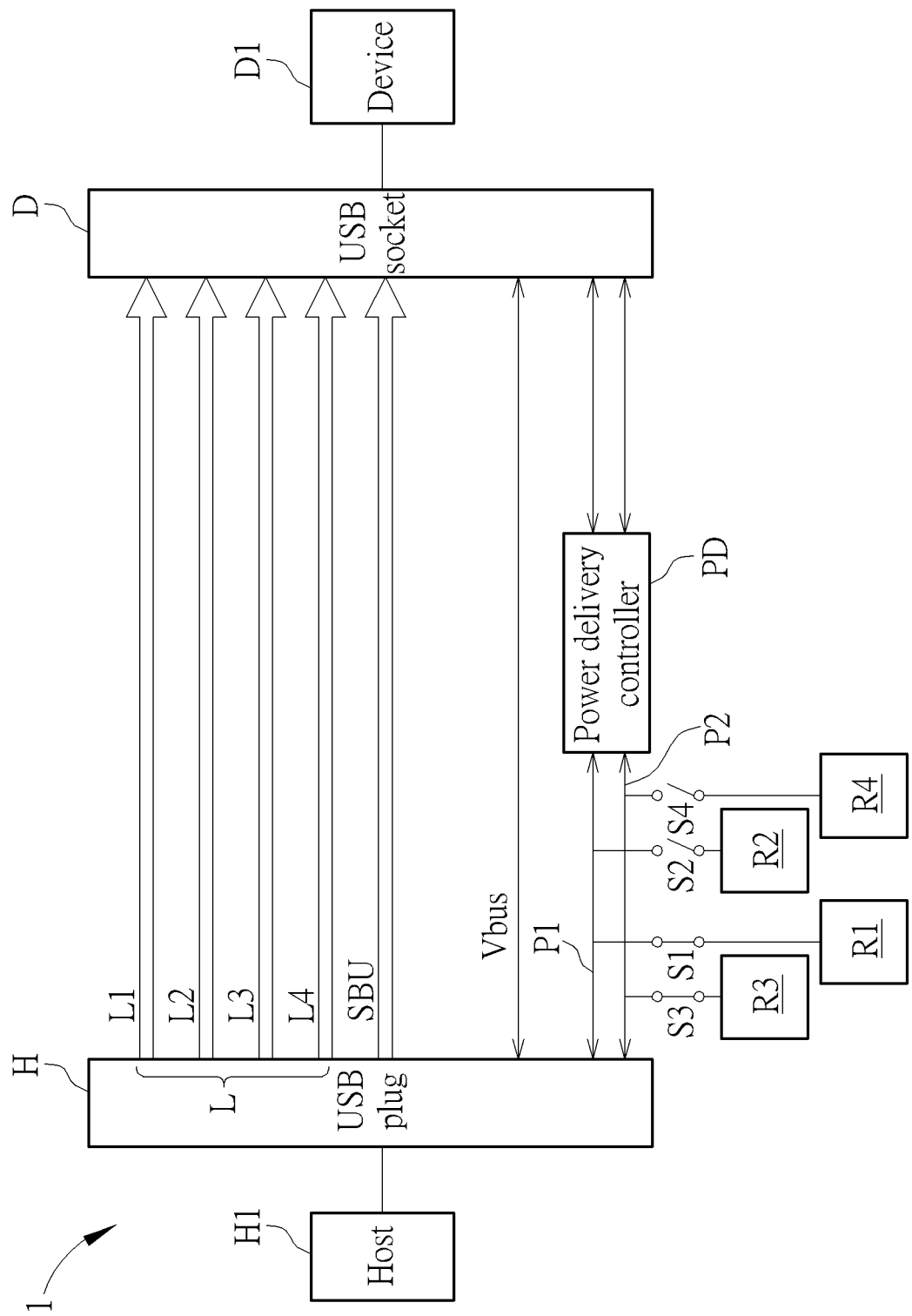
FIG. 1 shows a schematic diagram of a USB architecture according to an embodiment of the present invention.

FIG. 1 shows a schematic diagram of a Universal Serial Bus (USB) architecture 1 according to an embodiment of the present invention. The USB architecture 1 comprises a USB plug H, a USB socket D, a power delivery controller PD, a power wire Vbus, a signal transmission channel L, a first pin P1, a second pin P2, a first resistor switch S1, a second resistor switch S2, a third resistor switch S3, a fourth resistor switch S4 and a side band use (SBU) signal pin SBU. The USB plug H is a USB Type C interface plug and the USB socket D is a USB Type C interface socket. The power delivery controller PD is coupled to the USB plug H and the USB socket D. The power wire Vbus is coupled to the USB plug H and the USB socket D, and is configured to supply power from the USB plug H to the USB socket D. The signal transmission channel L is coupled to the USB plug H and the USB socket D, and is configured to send an image signal from the USB plug H to the USB socket D. The first pin P1 comprises a first end coupled to the USB plug H and a second end coupled to the power delivery controller PD. The second pin P2 comprises a first end coupled to the USB plug H and a second end coupled to the power delivery controller PD. The first resistor switch S1 is coupled to the first pin P1, and is configured to control a connection between a first resistor R1 and the first pin P1. The second resistor switch S2 is coupled to the first pin P1, and is configured to control a connection between a second resistor R2 and the first pin P1. The third resistor switch S3 is coupled to the second pin P2, and is configured to control a connection between a third resistor R3 and the second pin P2. The fourth resistor switch S4 is coupled to the second pin P2, and is configured to control a connection between a fourth resistor R4 and the second pin P2. The resistance of the first resistor R1 and the fourth resistor R4 may be 1 kiloohm (kΩ); the resistance of the second resistor R2 and the third resistor R3 may be 5.1 kiloohms (kΩ). In some embodiments, the resistance values of the first resistor R1 and the fourth resistor R4 may be omitted. The side band use (SBU) signal pin SBU is coupled to the USB plug H and the USB socket D, and is configured to send an SBU signal from the USB plug H to the USB socket D.

The USB plug H is connected to a host H1, and the host H1 may be a mobile phone. The USB socket D is connected to a device D1, and the device D1 may be a display, a docking station or a pair of augmented reality glasses. The signal transmission channel L comprises four channels L1-L4. The channel allocation is determined and the signals are sent according to the device configuration. The allocation of signal transmission channel L may be 4 channels of Display Port (DP) display bandwidth or 2 channels of DP display bandwidth and 2 channels of USB bandwidth.

Figure 2:
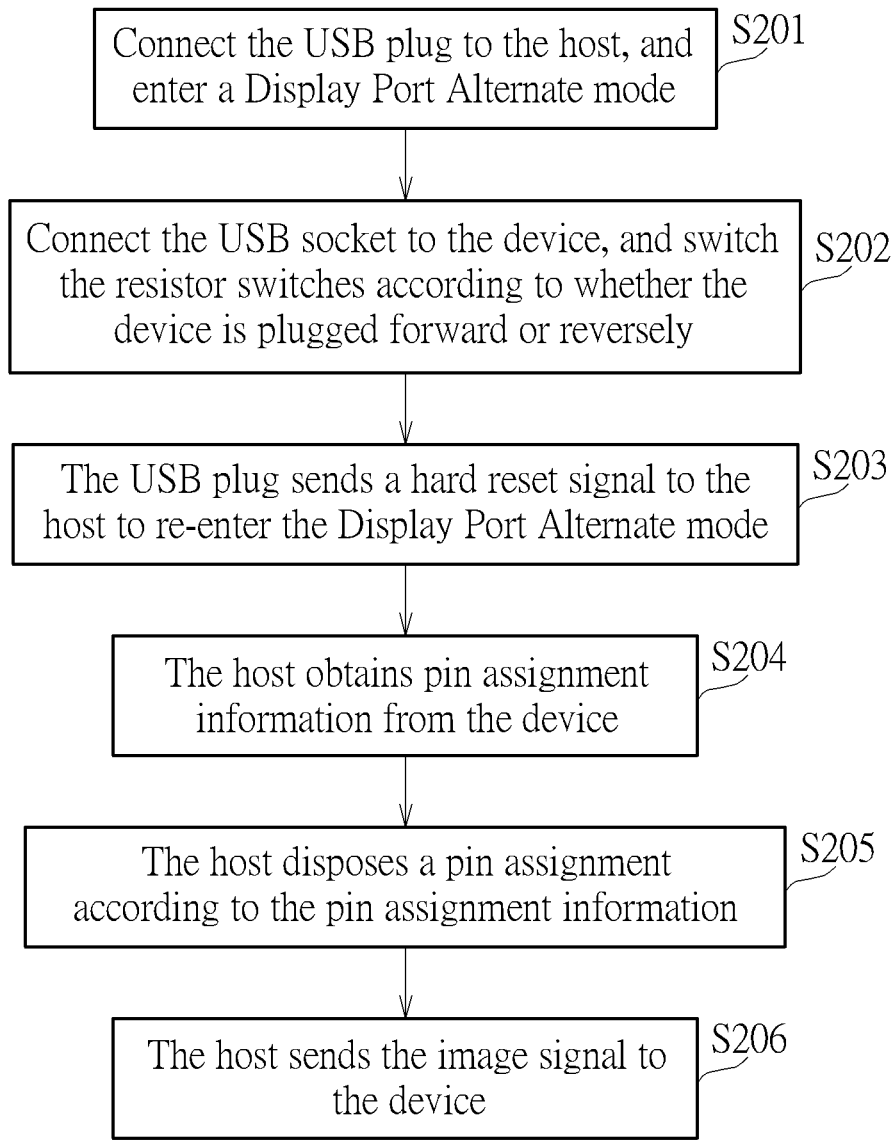
FIG. 2 shows a flowchart of a Display Port Alternate mode method of the USB architecture in FIG. 1.

FIG. 2 shows a flowchart of a Display Port Alternate mode method 2 of the USB architecture 1 in FIG. 1. The Display Port Alternate mode method 2 comprises Steps S201 to S206 and is used to perform the Display Port Alternate mode. Any reasonable step change or adjustment is within the scope of the disclosure. Steps S201 to S206 are explained as follows:

Step S201: Connect the USB plug H to the host H1, and enter a Display Port Alternate mode;

Step S202: Connect the USB socket D to the device D1, and switch the resistor switches according to whether the device D1 is plugged forward or reversely;

Step S203: The USB plug H sends a hard reset signal to the host H1 to re-enter the Display Port Alternate mode;

Step S204: The host H1 obtains pin assignment information from the device D1;

Step S205: The host H1 disposes a pin assignment according to the pin assignment information;

Step S206: The host H1 sends the image signal to the device D1.

In Step S201, when the USB plug H is connected to the host H1, the host H1 may be the Downstream Facing Port (DFP) and the USB plug H may be the upstream Facing Port (UFP), and the host H1 would send Display Port Alternate mode commands to the USB plug H to inquire the content of the Display Port Alternate mode, and enter the Display Port Alternate mode. In Step S201, the supported modes, the mode to be switched, the current status and the current configuration that the USB plug H responds to may be default values, and the details of the Display Port Alternate mode commands will be explained in subsequent paragraphs.

In Step S202, when the USB socket D is connected to the device D1, the USB socket D may be the Downstream Facing Port (DFP) and the device D1 may be the upstream Facing Port (UFP). The USB socket D determines whether the device D1 is plugged forward or reversely through the pins on the USB socket D, and determines whether to switch the first resistance switch S1, the second resistor switch S2, the third resistor switch S3 and/or the fourth resistor switch S4 according to whether the device D1 is plugged forward or reversely, to connect the first pin P1 to the first resistor R1 and the second pin P2 to the third resistor R3, or to connect the first pin P1 to the second resistor R2 and the second pin P2 to the fourth resistor R4. By switching the resistor switches according to whether the device D1 is plugged forward or reversely, whether the host H1 is plugged forward or reversely is determined. Please refer to FIG. 3 for the details of switching the resistor switches according to whether the device D1 is plugged forward or reversely.

In Step S203, the USB plug H sends a hard reset signal to the host H1 to cancel the Display Port Alternate mode entered in Step S201, and then the host H1 resends the Display Port Alternate mode commands to inquire the content of the Display Port Alternate mode to the USB plug H, and re-enters the Display Port Alternate mode.

In Step S204, the Display Port Alternate mode commands are sent to the USB socket D via the USB plug H, and then sent to the device D1 via the USB socket D. After receiving the Display Port Alternate mode commands, the device D1 responds to the Display Port Alternate mode commands by sending the content of the Display Port Alternate mode. The content of the Display Port Alternate mode includes pin assignment information. The pin assignment information is sent to the USB plug H via the USB socket D, and forwarded to the host H1 by the USB plug H, so the host H1 obtains the pin assignment information from the device D1. The pin assignment information may be the allocation requirements of the device D1 to the four channels L1-L4 of the signal transmission channel L.

In Step S205, after the host H1 obtains the pin assignment information, the host H1 disposes the pin assignment according to the pin assignment information to determine the allocation of the four channels L1-L4 in the signal transmission channel L. The allocation of the four channels may be 4 channels of Display Port (DP) display bandwidth or 2 channels of DP display bandwidth and 2 channels of USB bandwidth. By disposing the pin assignment according to the pin assignment information, the channel allocation of the host H1 is consistent with the requirements of the device D1 connected to the USB socket D. In Step S206, the host H1 sends the image signal to the device D1 through the signal transmission channel L after the host H1 disposes the pin assignment according to the pin assignment information.

FIG. 3 shows a chart of how the USB architecture 1 in FIG. 1 switches the resistor switches S1-S4 according to whether the device D1 is plugged forward or reversely. The state of the resistor switches S1-S4 may be to turn on the resistor switches S1 and S3 and turn off the resistor switches S2 and S4 to connect the first pin P1 to the first resistor R1 (1 kΩ) and the second pin P2 to the third resistor R3 (5.1 kΩ), or turn on resistor switches S2 and S4 and turn off resistor switches S1 and S3 to connect the first pin P1 to the second resistor R2 (5.1 kΩ) and the second pin P2 to the fourth resistor R4 (1 kΩ)). As shown in FIG. 3, in this embodiment, the default state is that the device D1 is plugged forward, indicating the first pin P1 is connected to the second resistor R2 (5.1 kΩ) and the second pin P2 is connected to the fourth resistor R4 (1 kΩ). The USB socket D determines whether to switch the resistor switches S1-S4 according to whether the device D1 is plugged forward or reversely. If the requirements of the device D1 are consistent with the default state (plugged forward), the resistor switches S1-S4 will not be switched. If the requirements of the device D1 are inconsistent with the default state (plugged reversely), the resistor switches S1-S4 need to be switched to connect the first pin P1 to the first resistor R1 (1 kΩ) and the second pin P2 to the third Resistor R3 (5.1 kΩ). It should be noted the default state may also be that the device D1 is plugged reversely; in this case, if the device D1 is plugged reversely, the resistor switches S1-S4 will not be switched. If the device D1 is plugged forward, the resistance switches need to be switched. In some embodiments, the resistance values of the first resistor R1 and the fourth resistor R4 may be omitted. By switching the resistor switches according to whether the device D1 is plugged forward or reversely to determine the host H1 is plugged forward or reversely, whether the host H1 is plugged forward or reversely may be indirectly controlled without using a high-speed multiplexer (MUX) to switch signals to allow the device D1 to plug forward and reversely, thus saving costs.

Figure 4:
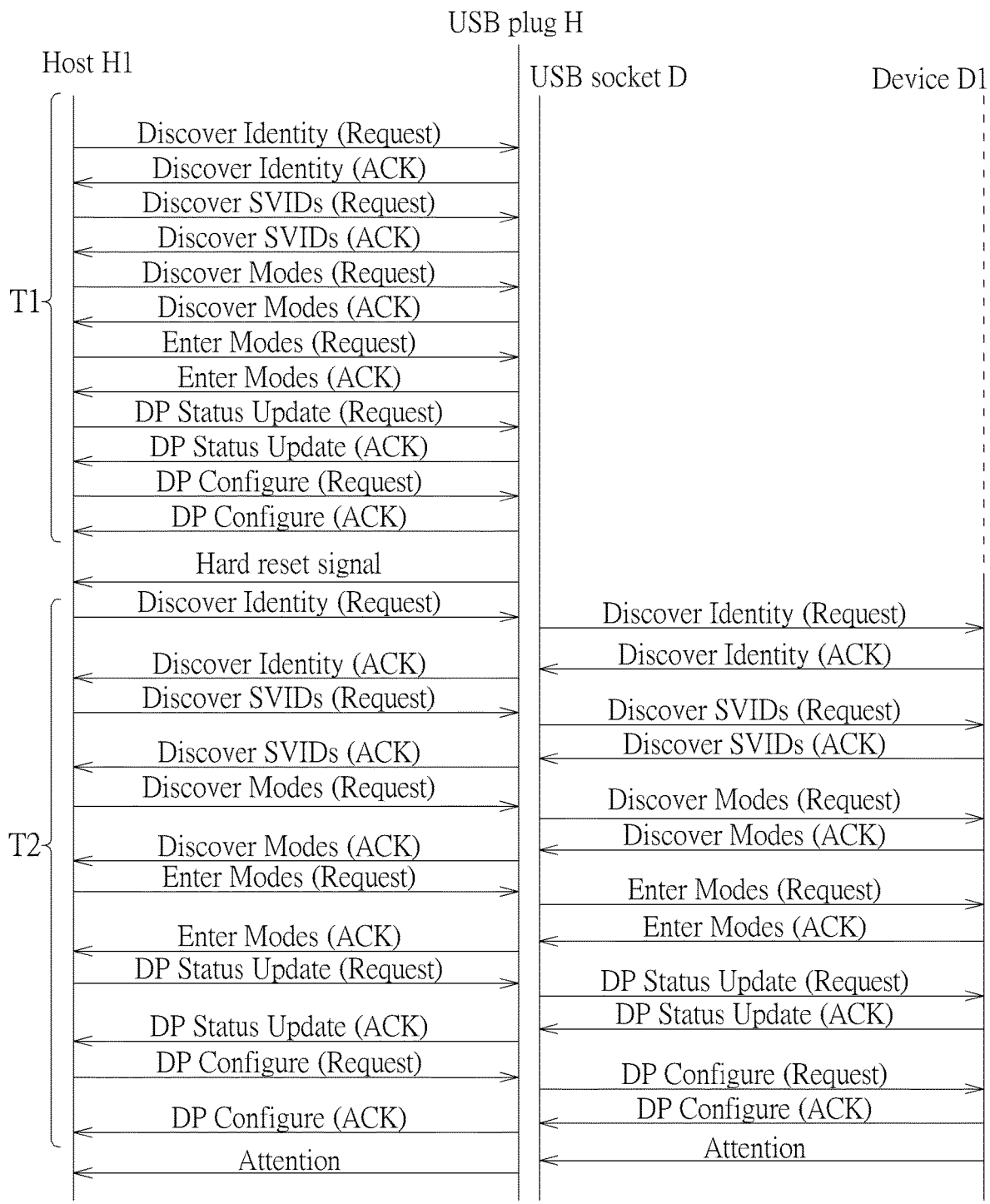
FIG. 4 shows a schematic diagram of the Display Port Alternate mode commands in FIG. 2.

FIG. 4 shows a schematic diagram of the Display Port Alternate mode commands in FIG. 2. The Display Port Alternate mode commands T1 in FIG. 4 include the Display Port Alternate mode commands sent in Step S201 of the Display Port Alternate mode method 2. The Display Port Alternate mode commands T2 in FIG. 4 include the Display Port Alternate mode commands resent after sending the hard reset signal in Step S203, and the Display Port Alternate mode commands sent by the device D1 to the host H1 via the USB socket D and the USB plug H to send the pin assignment information to the host H1 in Step S204.

The following is a description of each command in the Display Port Alternate mode commands T1: First, the host H1 sends a Discover Identity (Request) command to the USB plug H to confirm the identity and capabilities of the USB plug H. The USB plug H replies with a Discover Identity (ACK) command to indicate whether the USB plug H supports the Display Port Alternate mode. Second, since different Display Port Alternate modes have different SVIDs values, the host H1 sends a Discover SVIDs (Request) command to the USB plug H to confirm the Display Port Alternate mode supported by the USB plug H. The USB plug H replies with a Discover SVIDs (ACK) command to return the Display Port Alternate mode supported by the USB plug H. Third, the host H1 sends a Discover Modes (Request) command to the USB plug H, the Discover Modes (Request) command comprises the Display Port Alternate mode supported by the host H1. The USB plug H replies with a Discover Modes (ACK) command to confirm the Display Port Alternate mode supported by both the USB plug H and the host H1. Fourth, the host H1 sends an Enter Mode (Request) command to the USB plug H to inform the Display Port Alternate mode to be switched. The USB plug H replies with an Enter Modes (ACK) command to indicate the USB plug has received the information about the Display Port Alternate mode to be switched. Fifth, the host H1 sends a DP Status update (Request) command to the USB plug H to confirm the current status. The USB plug H replies with a DP Status update (ACK) command to return the current status. Sixth, the host H1 sends a DP Configure (Request) command to the USB plug H to confirm the current configuration. The USB plug H replies with a DP Configure (ACK) command to return the current configuration, the configuration includes pin assignment information. In T1, the supported modes, the mode to be switched, the current status and the current configuration that the USB plug H responds to may be default values.

In Step S203, after the USB socket D is connected to the device D1 and switches the resistor switches S1-S4 according to whether the device D1 is plugged forward or reversely, the USB plug H sends a hard reset signal to the host H1, and then the host H1 resends the Display Port Alternate mode commands. The re-sent Display Port Alternate mode commands are the commands in the Display Port Alternate mode commands T2 in FIG. 4. The differences between the Display Port Alternate mode commands T1 and T2 are, in the Display Port Alternate mode command T2, the commands are sent from the host H1, and sent to the USB socket D via the USB plug H, then sent to the device D1 via the USB socket D. The device D1 replies with commands, the commands replied by the device D1 are sent back to the host H1 via the USB socket D and the USB plug H. By sending the commands sent by the host H1 to the device D1 via the USB plug H and the USB socket D, replying with commands from the device D1, and sending the replied command back to the host H1 via the USB socket D and the USB plug H, the host H1 may obtain the pin assignment information from the device D1. The host H1 may dispose the pin assignment according to the pin assignment information to avoid the channel allocation of the host H1 being incompatible with the requirements of the device D1. After the commands in the Display Port Alternate mode commands T2 are completed, an Attention command is sent from the device D1. The Attention command is sent to the host H1 via the USB socket D and the USB plug H to send a task execution request, so the host H1 may send the image signal to the device D1 in the Step S206.

Figure 5:
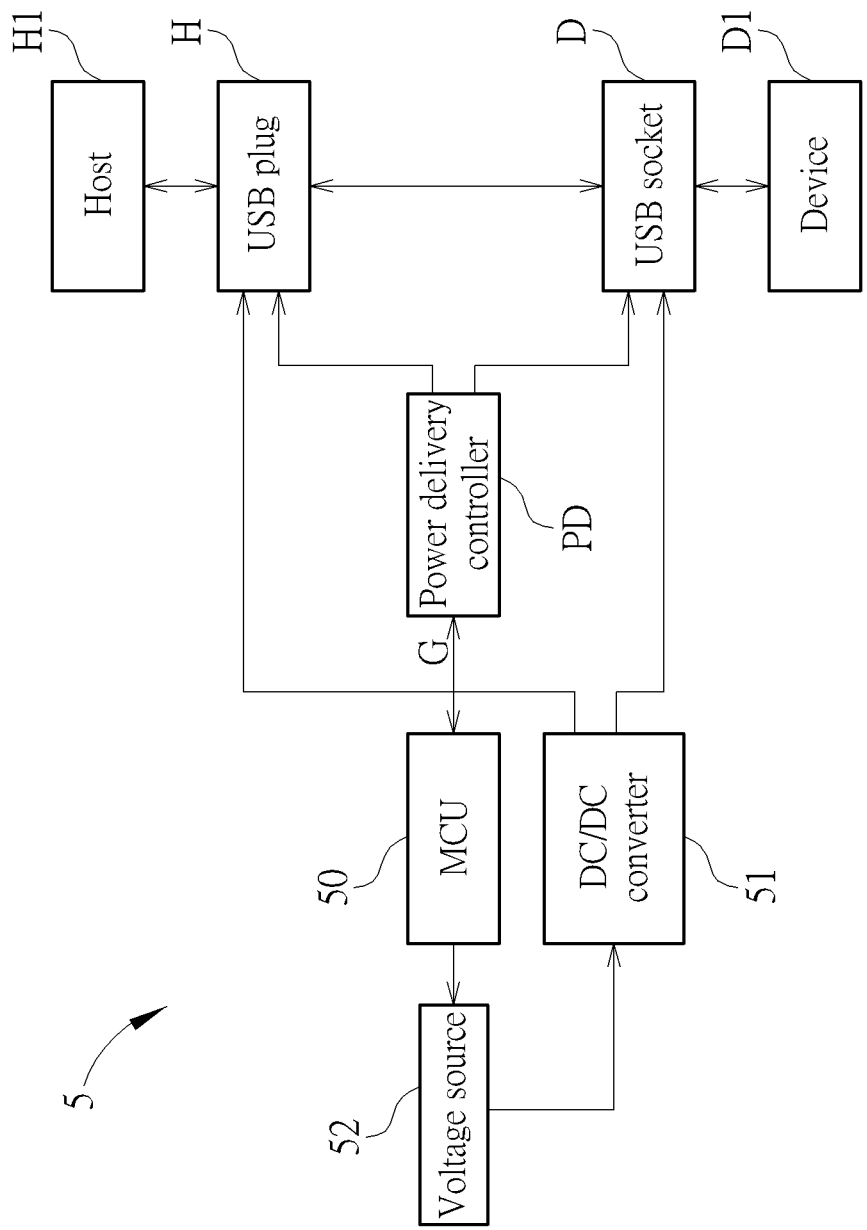
FIG. 5 shows a schematic diagram of a USB architecture according to another embodiment of the present invention.

In the USB architecture 1 in FIG. 1, if the device D1 is a device without a power supply of its own, the device D1 needs to be powered by the host H1. However, when the resistor switches connected to the first pin P1 and the second pin P2 are switched, or when the USB plug H sends the hard reset signal to the host H1, the pin signal will be reconnected, and the power supply from the power wire Vbus will also be interrupted, causing the power delivery controller PD to shut down. In this case, an external battery or a fixed voltage source may need to be connected to the power delivery controller PD to supply power to the power delivery controller PD. FIG. 5 shows a schematic diagram of a USB architecture 5 according to another embodiment of the present invention. In this embodiment, the host H1 sends the image signal to the device D1 via the USB plug H and the USB socket D. The device D1 is a device without a power supply of its own. The power delivery controller PD is connected to a microcontroller unit (MCU) 50, and the microcontroller unit 50 controls the voltage source 52. The voltage source 52 may be a battery or a fixed voltage source. When the USB architecture 5 starts to work, the host H1 supplies power to the power delivery controller PD, the microcontroller unit 50 and the device D1, and then the microcontroller unit 50 determines whether the voltage source 52 can supply power. After the microcontroller unit 50 determines the voltage source 52 can supply power, the microcontroller unit 50 notifies the power delivery controller PD to perform a power role swap (PR Swap) to change the power role from the host H1 to the voltage source 52, so that the voltage source 52 supplies stable power to the host H1 and the device D1. The power delivery controller PD communicates with the microcontroller unit 50 through a GPIO (general-purpose input/output) signal G. The voltage of the voltage source 52 can be converted through a DC/DC converter 51. By using the USB architecture 5, when the device D1 has no power supply of its own, the voltage source 52 may provide a stable power supply so the power supply will not be interrupted and the connection will be stable.

The USB architecture in the present invention may switch the resistor switches according to whether the device is plugged forward or reversely to determine the host is plugged forward or reversely without using a high-speed multiplexer (MUX) to switch signals to allow the device to plug forward and reversely, thus saving costs. With the USB architecture in the present invention, the host may dispose the pin assignment according to the pin assignment information obtained from the device, so the channel allocation of the host is compatible with the requirements of the device and avoids incompatibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A universal serial bus (USB) architecture comprising:
a USB plug;
a USB socket;
a power delivery controller coupled to the USB plug and the USB socket;
a power wire coupled to the USB plug and the USB socket, and configured to supply power from the USB plug to the USB socket;
a signal transmission channel coupled to the USB plug and the USB socket, and configured to send an image signal from the USB plug to the USB socket;
a first pin, comprising:
a first end coupled to the USB plug; and
a second end coupled to the power delivery controller;

a first resistor switch coupled to the first pin, and configured to control a connection between a first resistor and the first pin;
a second resistor switch coupled to the first pin, and configured to control a connection between a second resistor and the first pin;
a second pin, comprising:
a first end coupled to the USB plug; and
a second end coupled to the power delivery controller;
a third resistor switch coupled to the second pin, and configured to control a connection between a third resistor and the second pin; and
a fourth resistor switch coupled to the second pin, and configured to control a connection between a fourth resistor and the second pin, wherein:
when the USB plug is connected to a host, the host enters a Display Port Alternate mode;
when the USB socket is connected to a device, the USB plug sends a hard reset signal to the host to re-enter the Display Port Alternate mode and the host obtains pin assignment information from the device; and
the host disposes a pin assignment according to the pin assignment information.

2. The USB architecture of claim 1, further comprising a side band use (SBU) signal pin coupled to the USB plug and the USB socket, and configured to send an SBU signal from the USB plug to the USB socket.

3. The USB architecture of claim 1, wherein the USB plug is a USB Type C interface plug and the USB socket is a USB Type C interface socket.

4. The USB architecture of claim 1, wherein the host is a mobile phone, and the device is a display, a docking station or a pair of augmented reality glasses.

5. The USB architecture of claim 1, wherein:
the device sends the pin assignment information to the host via the USB socket and the USB plug.

6. The USB architecture of claim 5, further comprising:
the host sending the image signal to the device through the signal transmission channel after the host disposes the pin assignment according to the pin assignment information.

7. The USB architecture of claim 1, wherein when the USB socket is connected to the device, the USB socket determines whether the device is plugged forward or reversely and determines whether to switch the first resistor switch, the second resistor switch, the third resistor switch and/or the fourth resistor switch to connect the first pin to the first resistor and the second pin to the third resistor, or to connect the first pin to the second resistor and the second pin to the fourth resistor.

8. The USB architecture of claim 1, further comprising a battery or a fixed voltage source, configured to supply power to the power delivery controller.

* * * * *